May 8, 1962 — A. D. PALMER — 3,032,892
TEACHING DEVICE
Filed July 31, 1961
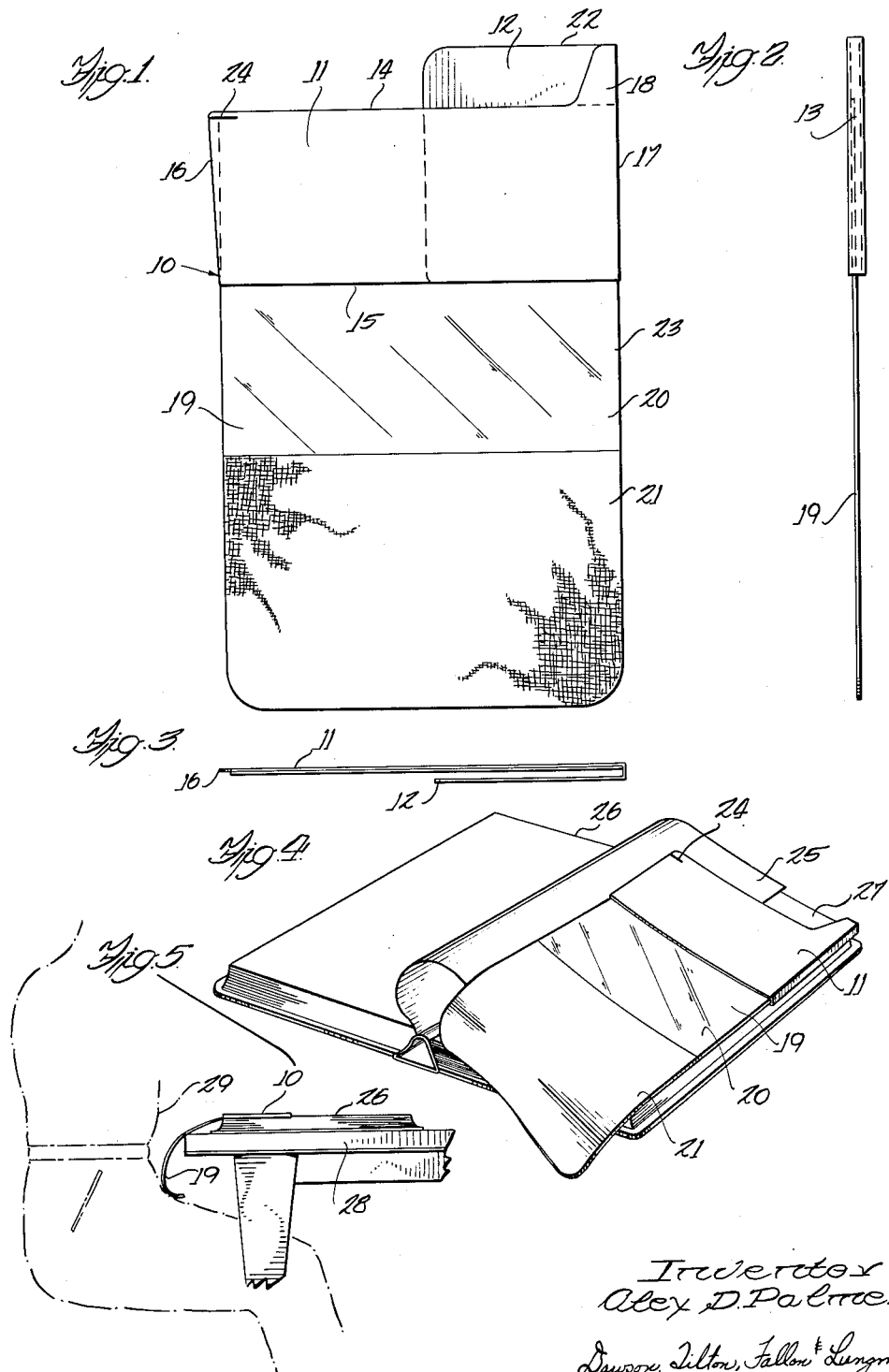
Inventor
Alex D. Palmer
Dawson, Tilton, Fallon & Lungmus
Attorneys

United States Patent Office 3,032,892
Patented May 8, 1962

3,032,892
TEACHING DEVICE
Alex D. Palmer, 915 Dempster, Evanston, Ill.
Filed July 31, 1961, Ser. No. 127,962
6 Claims. (Cl. 35—9)

This invention relates to a teaching device, and more specifically, to a device adapted for use with printed program material for the self-instruction of a user.

The present invention is a continuation-in-part of my copending application, Serial No. 83,568, filed January 18, 1961, now U.S. Patent No. 3,021,612.

Teaching machines and devices—that is, machines and devices which may be manipulated by a user to present critic questions for improving the user's comprehension and retention of subject matter to which he has been previously exposed—have received favorable and increasing recognition as valuable aids to education. A student using such a device in combination with programmed self-instruction sheets may proceed at a pace tailored to his own learning capabilities. Ordinarily, the answering of each of the questions exposed by the teaching device requires a thorough understanding of the subject matter covered by preceding questions and, therefore, an individual is often able to master subjects which he might fail to learn solely through classroom exposure. Furthermore, such devices tend to improve the reading ability of a user and to reinforce the learning process at a time when such reinforcement is considered to be particularly beneficial.

In my copending application, I disclose a teaching device formed from a single sheet of plastic material such as polystyrene, polyethylene or cellulose acetate. The teaching device is provided with parallel front and rear panels between which is slidably received one or a group of printed self-instruction sheets. Each self-instruction program sheet bears a list of printed questions and the printed answers to those questions directly therebelow. As the user slides the teaching device downwardly over the group of sheets, the questions and answers imprinted on the uppermost sheet are successively exposed to the reader.

It has been found that while the structure covered by my copending application is of considerable value in exposing questions and then answers in an orderly fashion for the self-instruction of a user, difficulty in manipulating the device may occur if the book or group of instruction sheets with which the device is associated is held on the user's lap or is supported upon a surface close to the user's body. In order to prevent contact which might restrain sliding movement of the teaching device, the book or sheets which slidably support the device must often be held at a distance from the user somewhat farther than the optimum reading distance.

Accordingly, it is a principal object of the present invention to provide a teaching device of extremely simple and inexpensive construction which overcomes the aforementioned problem. Specifically, it is an object to provide a teaching device for use in combination with programmed self-instruction sheets which may be moved over its full range of positions with respect to the sheets without being obstructed in its movement by a surface upon which the sheets rest or by contact with the user or objects in the path of movement of the device. Other objects will appear from the specification and drawings in which:

FIGURE 1 is a plan view of a teaching device embodying the present invention;

FIGURE 2 is a side view of the device;

FIGURE 3 is an end view;

FIGURE 4 is a perspective view of the device in combination with a book;

FIGURE 5 is a side elevational view showing the device and book supported upon a table surface, the device being in contact with the body of a user.

In the embodiment of the invention illustrated in the drawings, the numeral 10 generally designates a teaching device comprising a cover panel 11, a back panel 12 and a side wall 13. It is essential that the cover panel be formed from an opaque or non-transparent sheet of flexible material and, in the illustration given, both panels and the side wall are integrally formed from the same sheet. In addition to flexibility and non-transparency, the sheet material should be substantially unbreakable and non-deformable during ordinary use of the device. Flexible plastic materials such as polystyrene, polyethylene or cellulose acetate might be used as well as any other materials having similar properties of flexibility, durability and non-deformability.

As shown in FIGURE 1, the cover panel 11 is generally rectangular in shape, having top, bottom and side edges 14–17 respectively. The right side edge 17 is straight and is disposed at right angles to top edge 14. The cover is provided with an upper right side extension 18 which projects above edge 14 and which merges with side wall 13.

Secured to the undersurface of the cover panel and extending downwardly therefrom is a cover sheet 19. The cover sheet is generally rectangular, having a height greater than its width, and is formed from a highly flexible or bendable material such as, for example, a closely-woven fabric. The sheet is provided with upper and lower portions 20 and 21, the upper portion being coated or laminated with a suitable plastic material such as polyvinyl chloride but preferably a polyester film such as mylar. By reason of this lamination or coating, the upper portion of the sheet is less flexible and pliable than the lower portion thereof; however, both portions of the cover sheet are considerably more flexible and foldable than cover panel 11. As a result, the stiffness of the composite cover of the teaching device progressively increases from the bottom to the top thereof.

In addition to rendering the upper portion of the sheet 19 less flexible than lower portion 21, the plastic lamination also gives complete protection from moisture to that portion of the sheet which might be handled by a user during operation of the teaching device.

Preferably, the cover sheet is attached to the undersurface of the cover panel adjacent the upper edge thereof. When the device is in use, the face of the uppermost self-instruction sheet is therefore contacted by only the smooth and unbroken undersurface of the cover sheet 19.

Referring to FIGURE 2, it will be observed that the cover and back panels extend along spaced parallel planes. The width of the rear or back panel 12 is substantially less than the width of the front cover panel 11; in the illustration given, the former is approximately one half the width of the latter. In FIGURE 1, it will be seen that the rear panel projects upwardly above the top edge 14 of the front cover panel and has its upper edge 22 merging with the upper edge of extension 18 and extending at substantially right angles to side edge 17. Similarly, the top edge 14 of the cover panel extends at substantially right angles with reference to the side edge 17 and the right edge 23 of the cover sheet directly therebelow.

Adjacent the upper left corner of the front cover sheet 11 is an index line 24 parallel with the upper edge 14. This line may be imprinted or otherwise applied to the front panel and is intended to be aligned with similar markings on a program sheet during the operation of the device, as will now be described.

In the operation of the device, one or more program sheets are inserted into the space between the cover, comprising the cover panel and the cover sheet, and rear panel 12 so that the right edges of the sheets bear against side wall 13 and the left margins of the sheets are exposed laterally beyond side edge 16. Proper alignment of the device is assured by engagement between the edges of the printed program sheets and side wall 13. The device is initially positioned so that the printed matter upon the uppermost program sheet is covered by the non-transparent front cover panel 11 and the non-transparent cover sheet 19.

Each printed self-instruction sheet bears a list of printed questions and the printed answers to those questions directly below. Along the left margin of each sheet are printed marks or lines positioned to register with line 24 as the device is slid downwardly over the sheets. By successively aligning mark 24 with the complementary marks upon the program sheet, the user successively exposes the printed questions of the program sheet above the top edge 14. After each question has been studied and he has arrived at an answer, the user simply slides the device a short distance downwardly to expose the proper answer printed on the program sheet.

The upward extension 18 and the projection of rear panel 12 above front cover panel 11 tend to prevent tipping movement of the device even when the upper edge 14 is near the bottom of the program sheet and to prevent release of the device from the program sheet or sheets disposed between the cover and the rear panel.

FIGURE 4 shows a program sheet 25 of a book 26 as the program sheet is being removed from beneath the cover of the teaching device. Such removal is greatly facilitated by the flexibility of the cover sheet 19 and cover panel 11 which, it will be noted, are curved upwardly away from the next sheet 27 of the book. When the leaf 25 has been fully turned, the user may then proceed to study and answer the printed questions presented on sheet 27.

Since the lower portion 21 of the cover sheet 19, and to a lesser extent the upper portion 20 of that sheet, may be readily rolled or folded, contact between the lower edge of the cover sheet 19 and the user or some object, such as the supporting surface for the program sheets and device, does not interfere with or appreciably restrain the downward sliding movement of the teaching device with reference to the self-instruction sheets. This is illustrated in FIGURE 5 where it will be seen that the cover sheet 19 of the teaching device 10 droops over the rear edge of table top 28 and yields upon contact with user 29. Should the book be tipped upwardly so that it rests upon its lower edge, the highly flexible cover sheet 19 will simply follow in a general fashion the contour of the supporting surface as the teaching device is slid downwardly into a lowered position.

Since the upper portion 20 of the cover sheet is laminated or coated with a material which renders it less flexible than lower portion 21, bending or rolling of the cover sheet as its lower edge contacts an obstruction will occur first in the lower portion 21. Portion 20 will remain in relatively flat condition above the surface of the uppermost program sheet and will conceal the printed material upon that sheet despite the buckling, folding or rolling of lower portion 21. For practical purposes, it has been found that the laminated or coated upper portion 20 will not roll or bend because of contact between the cover sheet 19 and a part or object adjacent the bottom of the program sheets until the lower limits of upper portion 20 are urged below the lower edge of the uppermost instruction sheet.

While in the foregoing I have disclosed an embodiment of the invention in considerable detail for purposes of illustration, it will be understood by those skilled in the art that many of these details may be varied without departing from the spirit and scope of the invention.

I claim:

1. A teaching device adapted for use with programmed self-instruction sheets comprising a pair of panels extending along spaced parallel planes and having a pair of straight adjacent side edges, a straight side wall connecting said straight side edges together, said wall being slidably engageable with an edge of at least one programmed self-instruction sheet received between said panels for guiding movement of said device along said sheet, one of said panels comprising a cover panel and being formed from flexible and opaque sheet material, and an opaque cover sheet secured to said cover panel and extending downwardly from the lower edge thereof, said cover sheet being formed from a material of greater flexibility than said cover panel.

2. The structure of claim 1 in which said panels and said side wall are integrally formed from flexible and opaque sheet material.

3. The structure of claim 1 in which said cover sheet is provided with upper and lower portions, said upper portion having greater flexibility than said cover panel and less than said lower portion.

4. A teaching device for use with programmed self-instruction sheets comprising a pair of spaced parallel front and rear panels joined together along one side by a straight side wall, said panels and said side wall being integrally formed from non-transparent flexible sheet material, said front panel having a top edge extending at right angles to said joined side, and a non-transparent sheet of greater flexibility than said panels being secured to the undersurface of said front panel and extending downwardly therefrom.

5. The structure of claim 4 in which said cover sheet is secured to the undersurface of said front panel adjacent the upper edge thereof.

6. The structure of claim 4 in which said cover sheet is provided with upper and lower portions, said upper portion having a plastic material applied thereto to give said upper portion a lesser degree of flexibility than said lower portion.

References Cited in the file of this patent

UNITED STATES PATENTS

| | | |
|---|---|---|
| 680,311 | Browne | Aug. 13, 1901 |
| 1,350,186 | Straubel | Aug. 17, 1920 |
| 1,500,777 | Stevenson | July 8, 1924 |
| 2,234,075 | Carolin | Mar. 4, 1941 |
| 2,497,200 | Appel | Feb. 14, 1950 |